United States Patent [19]

Fisher

[11] Patent Number: 4,480,181

[45] Date of Patent: Oct. 30, 1984

[54] CARD CAPTURE DEVICE

[76] Inventor: Charles R. Fisher, 34781 Glen Dr., Eastlake, Ohio 44094

[21] Appl. No.: 451,533

[22] Filed: Dec. 23, 1982

[51] Int. Cl.³ .............................................. G06K 7/00
[52] U.S. Cl. ..................................... 235/486; 269/256
[58] Field of Search ...................... 235/483, 485, 486; 269/256

[56] References Cited

U.S. PATENT DOCUMENTS

| | | | |
|---|---|---|---|
| 3,042,299 | 7/1962 | Sherman | 235/483 X |
| 3,107,716 | 10/1963 | Wehmeyer | 269/256 X |
| 3,980,243 | 9/1976 | Schulman | 269/256 X |
| 4,037,703 | 7/1977 | Michaud et al. | 235/483 X |
| 4,252,303 | 2/1981 | Shimai | 269/256 X |

*Primary Examiner*—David L. Trafton
*Attorney, Agent, or Firm*—Watts, Hoffmann, Fisher & Heinke Co.

[57] ABSTRACT

A card capture device of the type to be employed in a data collection system including an articulated card clamp mechanism including a pair of oppositely disposed bar members mounting intermediately thereof a resilient gripping ring means adapted for frictionally gripping a card or badge to be read upon actuation of a drive motor so as to prevent forceable removal of the card or badge during reading thereof.

6 Claims, 13 Drawing Figures

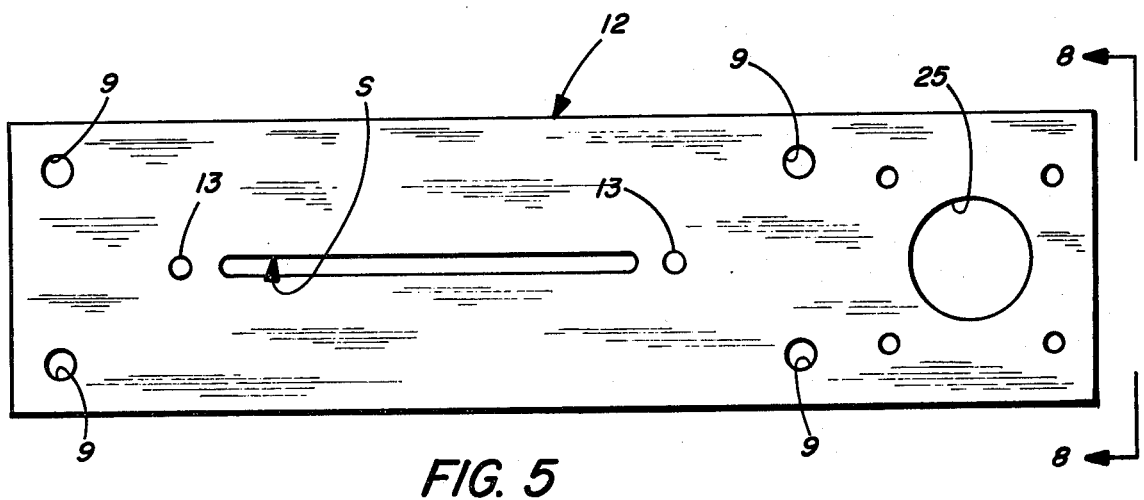
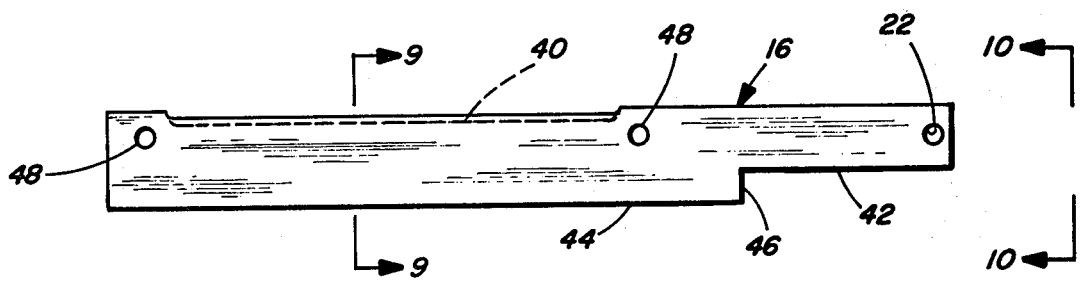
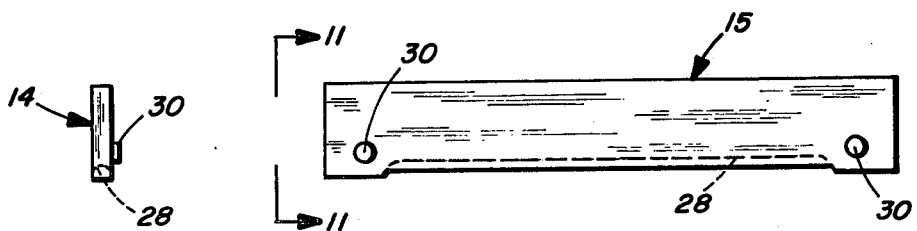
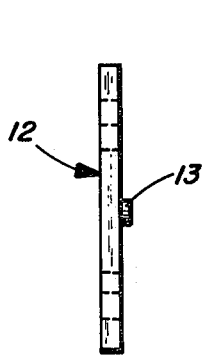
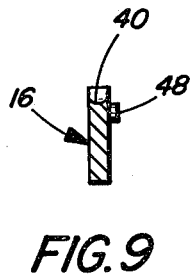
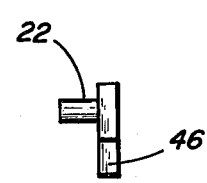
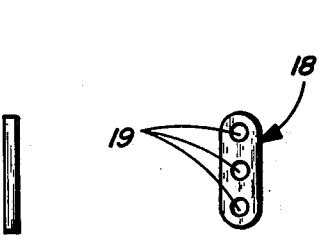

CARD CAPTURE DEVICE

DESCRIPTION

1. Techical Field

The invention relates to the field of data collection devices of the type for use for the collection, storing and retrieval of informational data such as, for example, in time and attendance, shop floor maintainance, employment security, commercial and credit transactions or the like. The invention relates generally to a data collection device which incorporates a card or badge reader device of the type which incorporates a new and novel card capture device. This device provides for card or badge captured by means of friction during the completion of a successful transaction. Accordingly, forcible removal of the badge or card during a transaction does not result in damage to either the card or badge or to the data collection device.

2. Background Art

The present invention relates generally to data collection devices or systems and more particularly relates to a new and improved badge or card reader device of the type which can read the card or badge without the use of moving parts other than the card or badge itself. Such type of reader device is disclosed in U.S. Pat. Nos. 3,661,007 and 4,102,649, to Charles Fisher, for example. In the present invention, there is provided a unique card or badge capture device which incorporates a parallelagram-type mechanism which, by friction, holds the card or badge against movement during the completion of a transaction. This mechanism is of a simple yet rugged and reliable construction. The mechanism effectively prevents forcible removal of the card or badge during a transaction and hence, does not result in damage to either the card or badge or to the data collection device itself.

DISCLOSURE OF THE INVENTION

In the present invention there is provide a unique capture device which can be easily and quickly installed as an integral apart of or as an accessory item to a card or badge reader device of the type for use in data collection systems such as for time and attendance, job security, shop for maintenence or the like. The capture device incorporates an opposed pair of clamp bars connected together by a linkage arrangement which maintains the bars in substantially parallel arrangement during opening and closing in the manner of a parallelagram action. The opposed clamp bar members are moved toward one another in clamping and unclamping relationship by means of a power drive motor with automatic control means for energizing said motor and for regulating a predetermined clamping pressure exerted on the card or badge to be held captive. A flexible retainer element made from an elastomeric or polymeric material is operably associated with the clamp members and is disposed for friction clamping engagement with the card or badge with sufficient holding friction pressure but without damage thereto.

BRIEF DESCRIPTION OF THE DRAWINGS

FIG. 5 is a front elevation view of the front support member for the card capture device;

FIG. 6 is a front elevation view of the lower clamp bar member made in accordance with the invention;

FIG. 7 is a front elevation view of the top clamp member made in accordance with the present invention;

FIG. 8 is an end elevation view looking in the direction of the line 8—8 of FIG. 5;

FIG. 9 is a vertical cross-section view taken along the line 9—9 of FIG. 6;

FIG. 10 is an end elevation view looking in the direction of the line 10—10 of FIG. 6;

FIG. 11 is an end elevation view looking in the direction of the line 11—11 of FIG. 7;

FIG. 12 is an end elevation view of the clamping bar illustrated in FIG. 6 looking from the left-hand side thereof; and FIG. 13 is a top plan view illustrating the construction of one of the link members made in accordance with the invention.

BEST MODE FOR CARRYING OUT THE INVENTION

Figure 1:
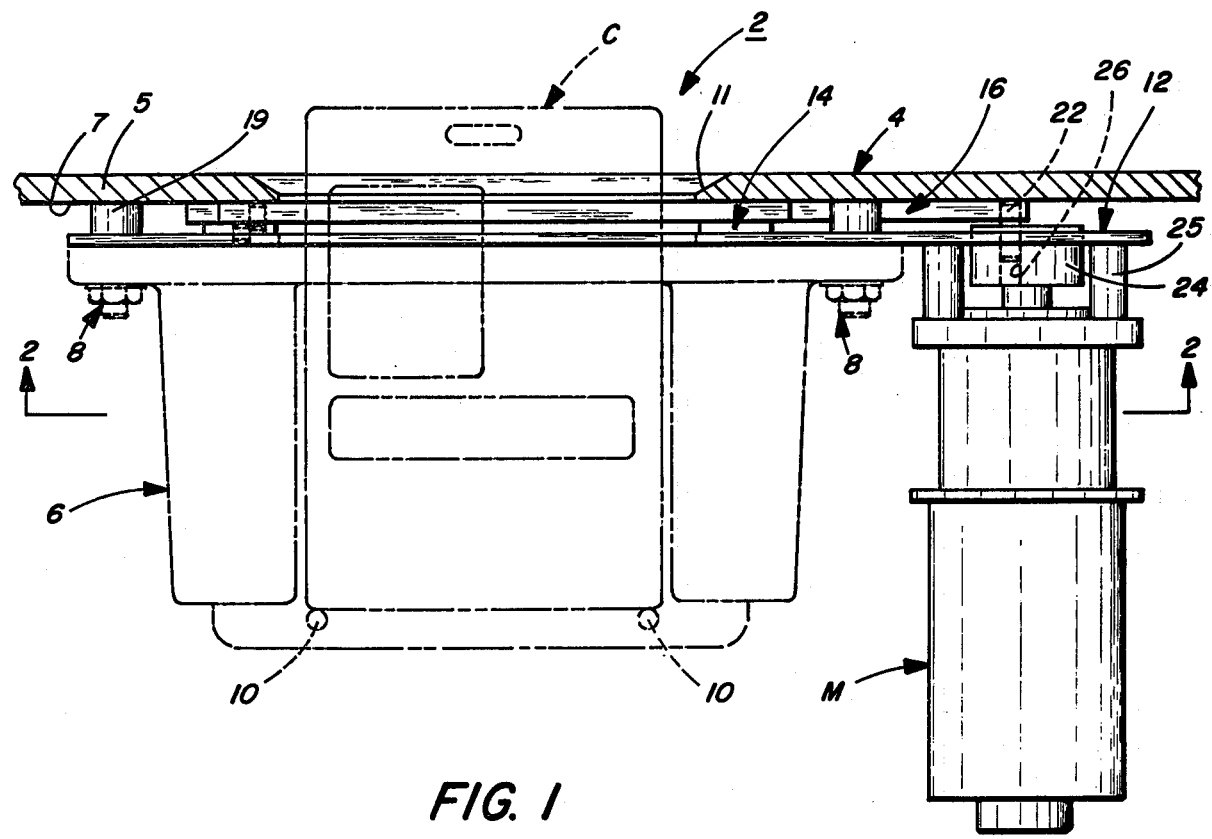
FIG. 1 is a fragmentary, generally top plan view illustrating a card reader device mounted interiorly on the front panel of a data collection terminal (not shown) with the card or badge capture device mounted on the reader device for holding a card or badge captive during a transaction.
Figure 2:
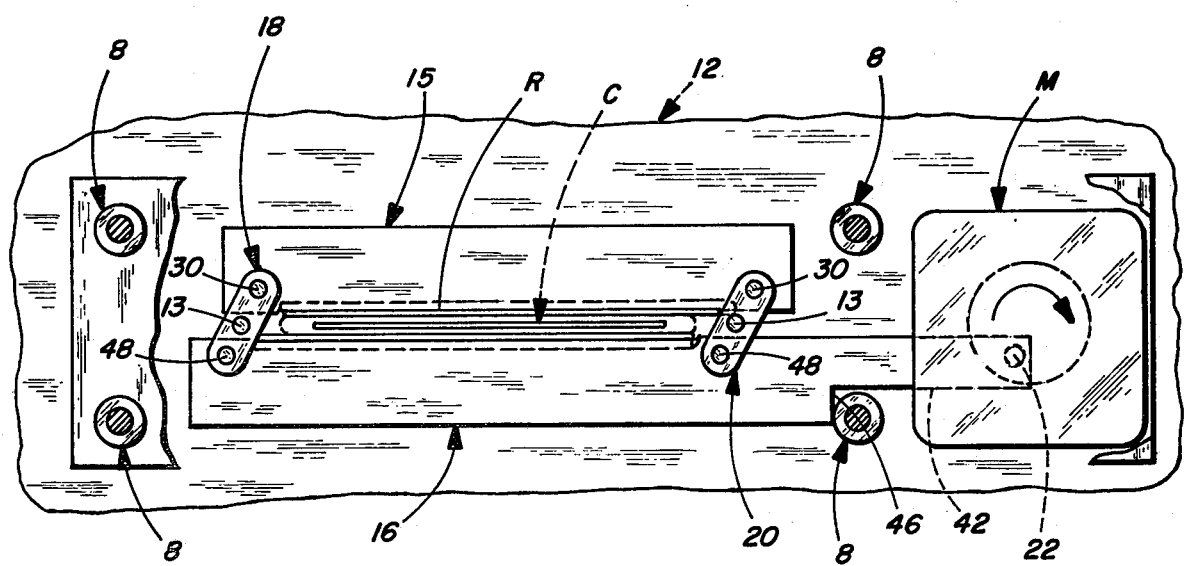
FIG. 2 is a fragmentary, vertical section view taken along the 2—2 of FIG. 1.

Referring to the drawings and in particular to FIGS. 1 and 2 thereof, there is generally illustrated the data collection device, designated generally at 2 of the invention of the type which includes a terminal housing, designated generally at 4, as illustrated in the U.S. Pat. No. 4,401,206 to Charles Fisher. The terminal mounts interiorly thereof a card reader device 6 which may be detachably connected to the front panel, as at 5, of the terminal by means of suitable fasteners, as at 8, which may include a suitable screw and nut arrangement. Spacer members, as at 19, may be provided to maintain a predetermined lateral spacing between the card reader device 6 and the confronting surface of the terminal front panel, as at 3, to accommodate the novel card capture device made in accordance with the invention. As shown, the card reader device 6 is constructed and arranged so as to receive and read a suitable card or badge, as at C. The details with respect to the structure and operation of the card reader device 6 are more fully set forth in the aforementioned Fisher U.S. Pat. No. 4,401,206.

Figure 3:
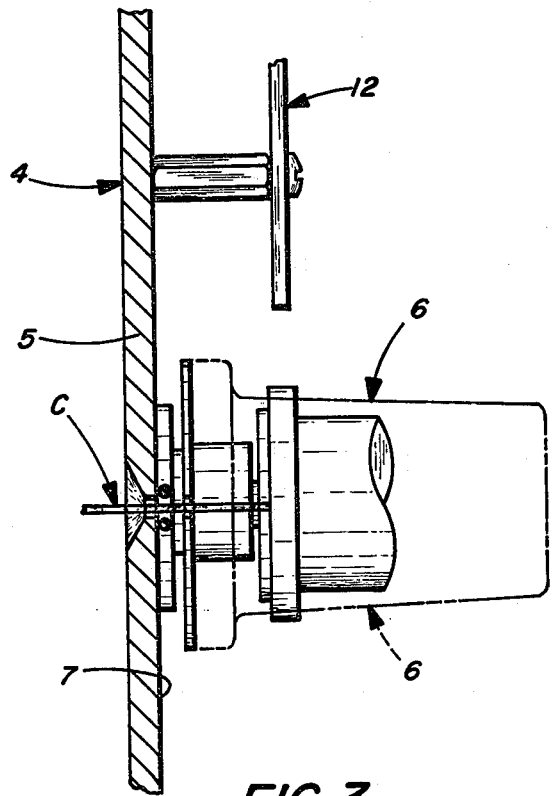
FIG. 3 is a fragmentary, side elevation view, with parts removed illustrating the capture device in association with a card reader device.
Figure 4:
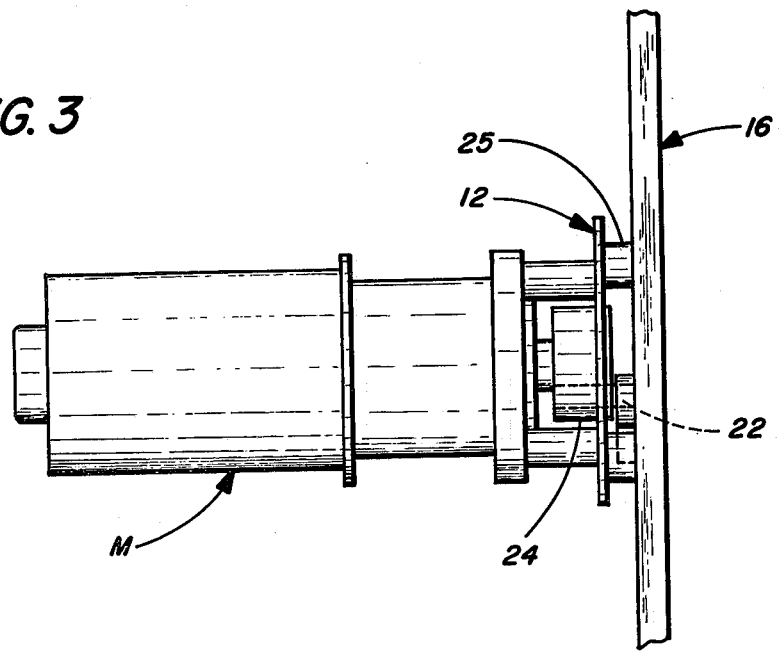
FIG. 4 is a fragmentary side elevation view, with parts removed for the purpose of clarity, illustrating more specifically the motor drive arrangement for the card capture device illustrated in FIG. 3.

For purposes of illustration only, the terminal, designated generally at 2, for the data collection device has been shown with respect to the front panel 5, as illustrated in FIG. 3. Accordingly, the card reader device, designated at 6, is mounted interiorly of the terminal on the front panel of the terminal such that the badge or card, as at C, is inserted through the front panel 5 so as to be read interiorly by the card reader device. It will be seen, therefore, that the card capture device, designated generally at 14, is disposed to operate between the card reader device and the confronting interior surface 9 of the front panel 5 of the terminal, as best illustrated in FIGS. 1 and 3.

As shown, the card capture device 14 includes an elongated polygonal (rectangular) support plate 12 which is mounted via the spacer member 7 and fasteners 8 to the confronting interior surface 5 of the front panel 5. This plate 12 mounts the card reader device 6 in spaced relation to the interior surface of the front panel. The construction of the support plate 12 is illustrated in FIG. 5 wherein it includes an interior elongated slot S for slideably receiving the card C therethrough which card is received through an aligned slot 11 provided in the front panel 5. The plate includes a plurality of holes, as at 9, for receiving the fasteners 8 and includes retaining pins 13 (FIG. 8) to be received in the intermediate slots, as at 19, provided in a pair of pivot links 18 (FIG. 13). Also, the support plate includes an enlarged circular opening 25 for receiving therethrough the drive coupling, as at 24, of an electric drive motor M, as illustrated in FIG. 1.

In the invention, the support plate 12 mounts an upper capture plate member 15 and a lower capture member 16 which act in a scissors-like manner for holding the card C in captured relation therebetween, as best seen in FIG. 2. The lower capture member 15 is an elongated (rectangular) construction having a pair of outwardly extending pins, as at 30, which are also received in the apertures 19 of the pivot links 18. In this case, the capture bar 15 has an elongated recess slot, as at 28, to receive one-half of a resillient polymeric ring R for frictionally holding the card C in clamped relation therein. The ring R is of an O-ring construction made preferably from a Buna N composition having a Durometer of 70, at a temperature between −40° to +250° F.

The lower capture bar member 16 is an elongated (rectangular) construction having a pair of upstanding pin elements, as at 48, for reception in the apertures 19 in the pivot links 18. In this case, the bar member has another outstanding pin element, as at 22, for engagement within the coupling member 24 of the drive motor M, as illustrated in FIGS. 1 and 2. Here again, the bar member has a recessed slot, as at 40, corresponding in configuration to the slot 28 in the upper bar member 15 for receiving the other half of the resillient gripping ring R. In this form, the lower bar member 16 is provided with a cut-out portion, as at 42, which defines a shoulder portion, as at 46, with the bottom edge 44. This shoulder portion 46 acts to engage upon one of the fastener elements, as at 8, providing an abuttment or stop (FIG. 2) to limit lateral shifting movement of the lower bar member 16 upon actuation by the drive motor M. The gripping ring R is frictionally held within the recessed grooves 28 and 40 so as to prevent lateral shifting movement thereof.

In the invention, the drive motor M is attached to the support plate 12 by a plurality of support posts 25 attached to the support member 12. The drive coupling member 24 of the motor has a slot, as at 26, disposed in eccentric relation to receive the pin element 22 of the lower capture bar member 16 so as to be driven in a circular but eccentric relation, as illustrated in FIG. 2. The drive motor M is in the form of a plantary gearmotor which has a rotor speed of approximately 2,400 RPM. By the eccentric or off-set drive connection between the motor and the lower capture bar member 16 there is provided a scissors-like action during opening and closing of the bar members 15 and 16 with the pivot links 18 maintaining the bar member 15 and 16 in parallel relation during opening and closing movement thereof in the form of a parallelogram action. Accordingly, during opening and closing movements of the bar members, the pivot links 18 remain parallel to one another so as to impart a uniform gripping action via the retainer ring on the card to be held in capture.

In the invention, the capture bar member 15 and 16 are held in parallel relation during opening and closing and it is preferred that from the full-open position upon rotation of the motor approximately 15°, the bar members close in clamping relation on the card C. Accordingly, the shoulder portion 46 acts as an abuttment or stop to control this closing action upon such 15° rotation, as illustrated in FIG. 2. Absent this abuttment or stop, it will be seen that the bar members would close at an angle of approximately 45°.

In a typical operation, the bar members 15 and 16 would be held in a parallel relationship with the pivot links being disposed at parallel and approximately at an angle of 80°. In FIG. 2, the bar members are illustrated in the generally closed condition with the drive motor being rotated in a clock-wise direction as illustrated by the arrow. To open the bar members, the motor is driven in reverse such that the lower bar member 16 is driven to the left with the pivot links pivoting back approximately 15° to the original 80° position which has the effect of simultaneously raising the upper bar member 15 due to the pivotal connection of the links 18 about the pin elements 13 which provide pivot points therefore. By reason of the articulated connection via the pivot links 18, the lower bar member 16 is moved to the left and simultaneously upward in a parallelogram fashion relative to the upper bar member 15. To again close the bar members, the electric motor is reversed and driven in a clock-wise direction approximately 15° until the shoulder portion 46 provides a stop which is the predetermined capture position of the bar members relative to the card C. In this closed position, the card is held capture with a predetermined force sufficient to prevent manual withdraw thereof until the pressure is released upon actuation of the drive motor. Accordingly, it will be seen by this arrangement forceible removal of the card during a transaction (i.e. encoding) does not result in damage to either the card or to the data collection device including the card reader.

Other and further objects of the invention will become apparent as the following description procedes when taken in conjunction with the accompanying claims.

I claim:

1. A card capture device for releasably holding a card or badge to be encoded in a card reader device comprising a housing adapted to mount interiorly thereof a card reader device, said capture device including a pair of oppositely disposed capture bar members, articulated link means for holding said bar members together for opening and closing movement relative to one another for holding said card or badge in clamped relation therebetween upon actuation of a motor drive means.

2. A card capture device in accordance with claim 1, wherein a endless resilient gripping means is disposed for coacting engagement between said bar members for resiliently maintaining said card or badge in captured relation between said bar members in the closed position thereof.

3. A card capture device in accordance with claim 1, wherein said bar members include an upper bar member and a lower bar member, said link means including an oppositely disposed pair of pivot links, said pivot links being pivotally attached at their opposed ends to the associated of said bar members with said pivot links being operably connected intermediate their ends by a pivot pin means operably connected to a support member.

4. A card capture device in accordance with claim 1, wherein said bar members include an upper bar member and a lower bar member pivotally mounted by a pair of opposed pivot links to a support member, said support member being fixedly attached to the interior of said housing on one side and mounting said card reader device on the opposite side thereof.

5. A card capture device in accordance with claim 1, wherein said bar members include an upper bar member and a lower bar member pivotally mounted by a pair of oppositely disposed pivot links, said pivot links being pivotally connected to a support member with said support member adapted to be detachably connected to the interior of said housing, said card reader device being mounted by the opposite side of said support member remote from the interior surface of said housing, and with said housing and said support member having generally aligned slots adapted to receive said card or badge therethrough upon insertion into said card reader device so as to be read therein.

6. A card capture device in accordance with claim 5 wherein said lower bar member includes an elongated arm portion having a cut-out portion adapted to engage against a stop means for limiting transverse movement of said lower bar member relative to said support member, and said arm portion being operably connected in eccentric relationship to said drive means for imparting linear drive motion to said lower bar member and to said upper bar member upon rotary drive movement of said drive means.

* * * * *

UNITED STATES PATENT AND TRADEMARK OFFICE
CERTIFICATE OF CORRECTION

PATENT NO. : 4,480,181
DATED : October 30, 1984
INVENTOR(S) : Charles R. Fisher

It is certified that error appears in the above-identified patent and that said Letters Patent is hereby corrected as shown below:

Column 1, line 5, "Techical" should be -- Technical --;
         line 41, "provide" should be -- provided --;
         line 43, "apart" should be -- part --.

Column 4, line 41, "forceible" should be -- forcible --;
         line 60, "a" should be -- an --.

Signed and Sealed this

Twenty-sixth Day of March 1985

[SEAL]

Attest:

DONALD J. QUIGG

Attesting Officer     Acting Commissioner of Patents and Trademarks